United States Patent
Lim et al.

(10) Patent No.: US 7,222,299 B1
(45) Date of Patent: May 22, 2007

(54) DETECTING QUOTED TEXT

(75) Inventors: Jing Yee Lim, Santa Clara, CA (US); Paul Buchheit, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 366 days.

(21) Appl. No.: 10/740,994

(22) Filed: Dec. 19, 2003

(51) Int. Cl.
*G06F 15/00* (2006.01)

(52) U.S. Cl. .................................... 715/531

(58) Field of Classification Search ............... 715/500, 715/530, 531, 752
See application file for complete search history.

(56) References Cited

U.S. PATENT DOCUMENTS

| | | | |
|---|---|---|---|
| 5,719,941 A * | 2/1998 | Swift et al. ................. 713/155 |
| 5,832,171 A | 11/1998 | Heist ........................... 386/46 |
| 5,958,006 A | 9/1999 | Eggleston et al. .......... 709/219 |
| 5,995,597 A | 11/1999 | Woltz et al. ............. 379/93.24 |
| 6,098,034 A * | 8/2000 | Razin et al. .................... 704/9 |
| 6,393,428 B1 * | 5/2002 | Miller et al. ................ 707/102 |
| 6,469,720 B1 | 10/2002 | Ringot ....................... 345/829 |
| 6,496,841 B1 * | 12/2002 | Tognazzini ................. 715/512 |
| 6,502,112 B1 * | 12/2002 | Baisley ....................... 715/513 |
| 6,519,629 B2 | 2/2003 | Harvey et al. .............. 709/204 |
| 6,553,372 B1 * | 4/2003 | Brassell et al. ................. 707/5 |
| 6,640,301 B1 * | 10/2003 | Ng .............................. 713/156 |
| 6,701,350 B1 | 3/2004 | Mitchell ..................... 709/217 |
| 6,792,448 B1 | 9/2004 | Smith ......................... 709/204 |
| 6,820,081 B1 | 11/2004 | Kawai et al. .................. 707/7 |
| 6,832,373 B2 * | 12/2004 | O'Neill ....................... 717/171 |
| 2002/0089533 A1 * | 7/2002 | Hollaar et al. .............. 345/738 |
| 2002/0176572 A1 * | 11/2002 | Ananth ......................... 380/37 |
| 2003/0081615 A1 * | 5/2003 | Kohn et al. ............. 370/395.42 |
| 2003/0088830 A1 * | 5/2003 | Tognazzini ................. 715/515 |
| 2003/0172066 A1 * | 9/2003 | Cooper et al. .................. 707/7 |
| 2003/0182238 A1 * | 9/2003 | Brookner et al. ............. 705/62 |
| 2003/0200263 A1 * | 10/2003 | Goldberg .................... 709/206 |
| 2003/0204703 A1 * | 10/2003 | Rajagopal et al. .......... 711/216 |
| 2004/0019644 A1 * | 1/2004 | Fellenstein et al. ......... 709/206 |
| 2004/0044735 A1 | 3/2004 | Hoblit ........................ 709/206 |
| 2004/0064737 A1 * | 4/2004 | Milliken et al. ............ 713/201 |
| 2004/0083432 A1 | 4/2004 | Kawamura et al. ......... 715/526 |
| 2004/0111480 A1 * | 6/2004 | Yue ............................ 709/206 |
| 2004/0199773 A1 * | 10/2004 | Radatti et al. .............. 713/176 |
| 2005/0081059 A1 * | 4/2005 | Bandini et al. ............. 713/201 |
| 2005/0132205 A1 * | 6/2005 | Palliyil et al. .............. 713/188 |

(Continued)

OTHER PUBLICATIONS

Conrad et al., Online Duplicate Document Detection : Signature Reliability in a Dynamic Retrieval Environment, ACM 2003, pp. 443-452.*

(Continued)

*Primary Examiner*—Cong-Lac Huynh
(74) *Attorney, Agent, or Firm*—Morgan, Lewis & Bockius LLP (57) ABSTRACT

A method and apparatus for detecting quoted text within a document, such as an email message or email thread, is described. A text comparison is performed to identify a block of quoted text within the document. The boundaries of the block of quoted text are identified by performing a character-by-character analysis on text surrounding the identified block of quoted text. The block of quoted text is elided so that an individual can easily identify the block of quoted text as having previously been viewed.

39 Claims, 9 Drawing Sheets

U.S. PATENT DOCUMENTS

2005/0132206 A1* 6/2005 Palliyil et al. ............... 713/188
2006/0244639 A1* 11/2006 Parker .......................... 341/51

OTHER PUBLICATIONS

Bellotti et al., Taking Email to Task : The Design and Evaluation of a Task Management Centered Email Tool, ACM 2003, p. 345-352.*

Fernstrom, Management of Trusted Citations, ACM 2003, pp. 243-245.*

Conrad et al., Online Duplicate Document Detection: Signature Reliability in a Dynamic Retrieval Environment, ACM 2003, pp. 443-452.* php Messageboard Screen Shots (2002-2005) (10 pages).

* cited by examiner

DETECTING QUOTED TEXT

BACKGROUND

A. Technical Field

The present invention relates generally to detection of quoted text within a document, and more particularly, to the detection and display of quoted text within an email message.

B. Background of the Invention

The importance of email technology in society today is well known. Email applications have become a common tool in both business and personal communication. A significant factor in the widespread adoption of email technology is the relative ease in which individuals may communicate using email. An individual may communicate a message to another individual by simply typing the message into a computer and clicking a mouse button. A response to this email can then be generated in a similar manner. A typical result of this process is an email thread in which multiple messages between multiple individuals are displayed on a computer screen, in which a history of messages and responses to an individual is shown.

Figure 1:
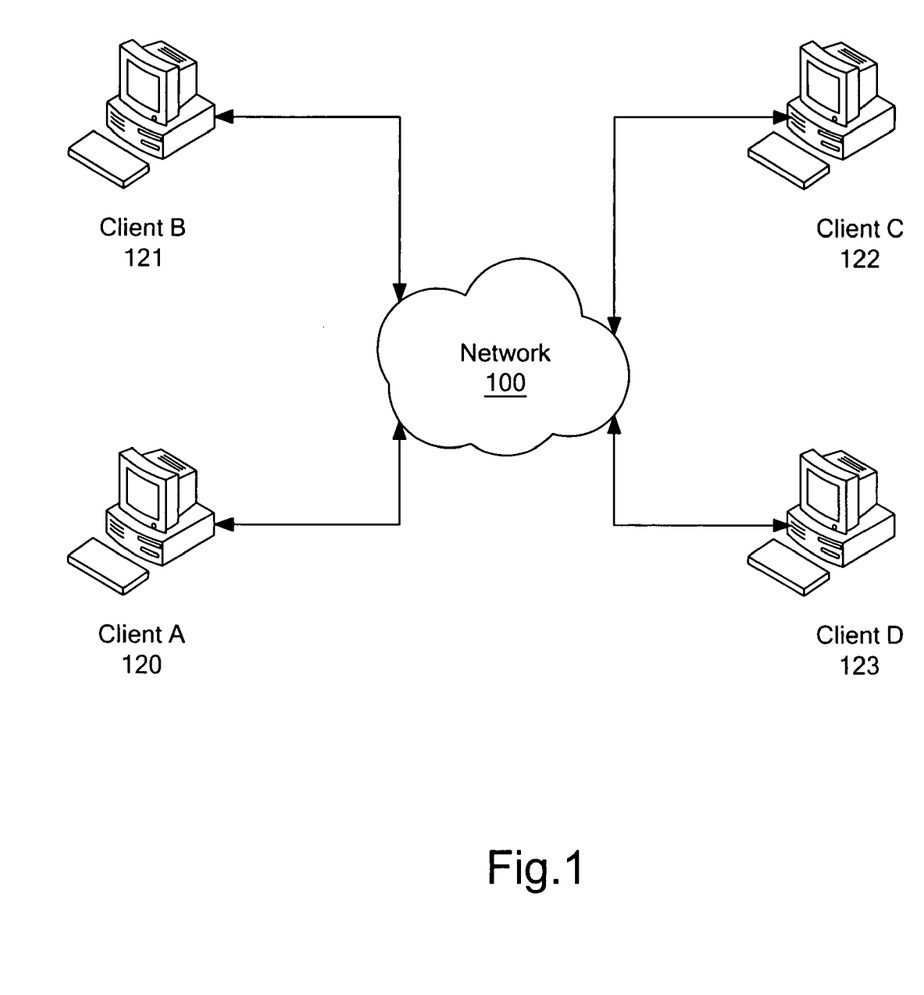
FIG. 1 is an exemplary block diagram of a network on which email traffic may occur.

FIG. 1 illustrates an exemplary network on which email messaging may occur. As shown, each of the computer clients, Client A 120, Client B 121, Client C 122, and Client D 123, are coupled to a network 100. This network may be a private network, a public network such as the Internet, or combination thereof. The computer clients (120, 121, 122, 123) are able to communicate with each other through virtual connections on the network 100, including email communications. This email communication between the multiple computer clients (120, 121, 122, 123) may produce an email thread in which messages from the clients (120, 121, 122, 123) are embedded. Over time, this email thread may become lengthy and complex due to the number of parties communicating and the number of messages embedded within the thread.

Figure 2:
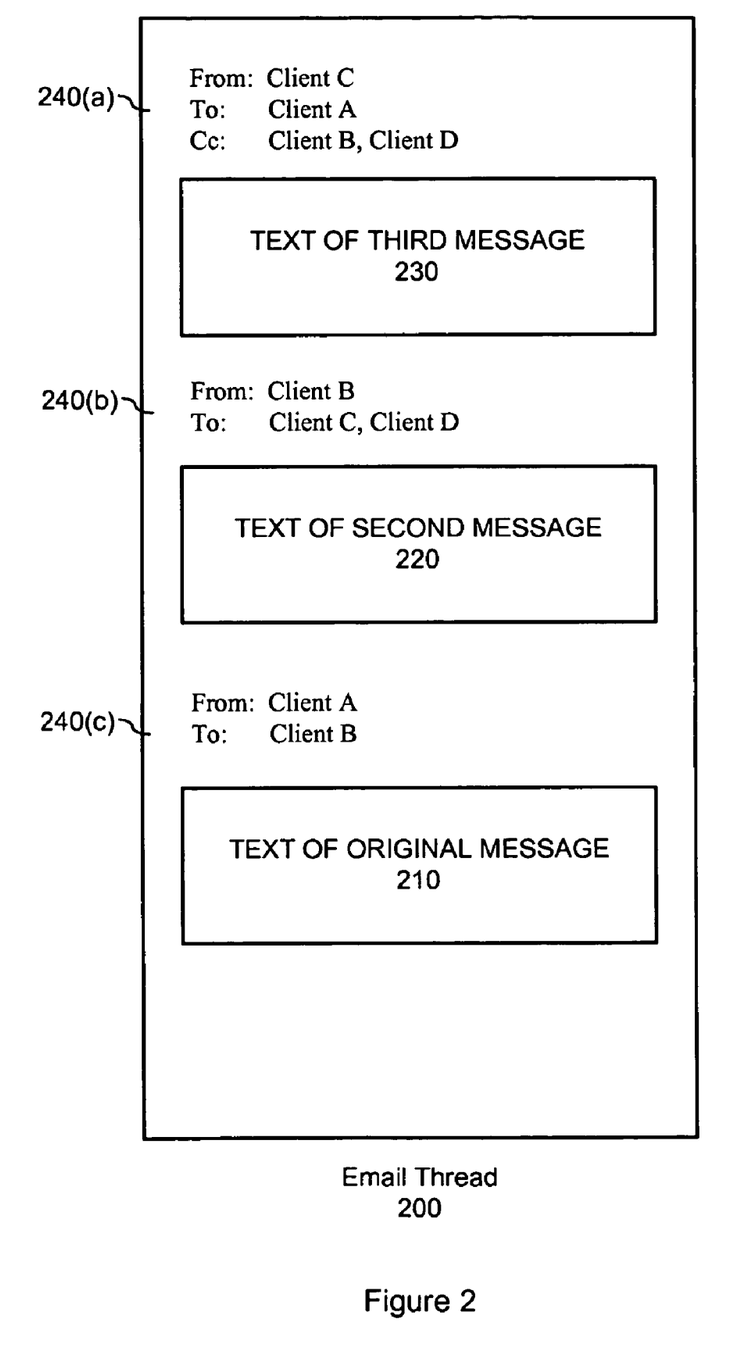
FIG. 2 is an exemplary illustration of an email chain containing multiple users.

FIG. 2 illustrates an exemplary email thread having multiple related email messages from different individuals embedded therein. This email thread 200 represents a typical exchange between multiple individuals whereby a number of related email messages are generated, sent to particular individuals and displayed as a conversation thread. As shown, the email thread 200 has an original email message (represented by a box) 210, located at the bottom of the thread, which was sent to Client B 121 from Client A 120. The email thread also has a second email message (represented by a box) 220, located in the middle of the thread, which was sent to Client C 122 and Client D 123 from Client B 121. A third email message (represented by a box) 230, located at the top of the email thread 200, was sent from Client C 122 to Client A 121, and provided a copy of the message to Client B 121 and Client D 123.

The email thread 200 may become confusing if the various email messages embedded within the thread are not properly highlighted or elided from the thread to enable a reader of the thread to identify email messages that she has not previously seen. In order to avoid confusion within a lengthy email thread, each text message needs to be clearly delineated from the other messages. Also, an individual should be able to quickly identify messages within this thread that have not been previously viewed. Accordingly, text, within email messages, that is being quoted from a message originally sent or previously read by the individual should be appropriately highlighted or elided. This highlighted or elided quoted text will allow the individual to more quickly identify message text that has not been read.

Referring to FIG. 2, the text within the email thread 200 should be highlighted or elided according to which client is displaying the thread 200. For example, if the thread 200 is displayed to a recipient on Client A 120, then the original text message 210 should be highlighted or elided because it was originally sent by the individual on Client A 120. If the thread 200 is displayed on Client B 121 to another recipient, then the original text message 210 should be highlighted or elided because it was previously read and the second text message 220 should be elided because it was originally sent by the recipient on Client B 121. This described format presents the email thread in a simple arrangement and better enables email communication between the various clients (120, 121, 122, 123).

Some current email applications delineate messages within an email thread by looking at headers within the thread. For example, as shown in FIG. 2, these applications would look for email headers 240 to segregate each of the text messages within the thread 200. However, these applications fail to specifically highlight or elide quoted text in relation to the recipient or client that is viewing the email thread 200. Oftentimes, in response to an email message, an individual may wish to input text or answer particular questions found within the body of the received email message itself. The responding email thread may become further difficult to read if this inserted text is not clearly identified within the thread.

Some current email applications also fail to properly compensate for modification, translation and interpretation errors caused by a network or email application. As an email file is being interpreted by different email applications, errors may occur within the body of the file such as an incorrect character coding or a mistranslated word. These errors may make it difficult to identify quoted text in the email thread because the quoted text was slightly and erroneously modified by an application. For example, characters may be incorrectly encoded by certain email applications or words may be mistranslated by translation software. These modifications result in erroneously modified blocks of text. Current email applications may be unable to compensate for such events and may display erroneously modified block of quoted text as new text that has not been previously viewed.

Current email applications also generally lack a dynamic ability to properly compensate for characters or HTML markups. As emails are processed by various applications, certain characters may be inserted (such as a ">" or "{") for various purposes that may present certain problems in identifying quoted text. For example, some email applications rely solely on an identifier, such as ">" to identify quoted text. If this identifier is not inserted, then the application may be unable to properly identify quoted text. Also, inserted characters may cause an email application to miss quoted text because the quoted text was improperly modified, through the insertion of the character, by the email application. Furthermore, current web-based or mark up language compatible email applications may not be able to account for HTML markups that provide certain functionality such as text characteristics or locations when attempting to identify quoted text. As a result of these shortcomings in current email applications, certain email threads may be difficult to read or have unread text buried within other messages.

Accordingly, what is desirable is an improved system for addressing the above-described limitations of prior systems.

SUMMARY OF THE INVENTION

In accordance with one aspect of the invention, a system and method is provided which allows detection of text within an email message or email thread that has been previously displayed to an individual. This quoted text from previous emails may be elided or highlighted so that the recipient may relatively easily recognize the text block as being quoted from a previous email. Oftentimes, when an individual is responding to an email, the original email is appended to the response resulting in an email thread. Various embodiment of the invention elide this original email text block or highlight this text block so that it is easily discernable as quoted text when the email thread is displayed.

In one embodiment of the invention, after an email message or email thread is received, text within the received email is compared to text that has been previously viewed by the recipient of the email, such as previous messages within the thread itself. For example, this previously viewed text may be an email message that the recipient previously composed or an email message that the recipient had previously viewed. In one embodiment, hash values are generated from the word sequences in both the received email and the previously viewed text. These hash values are compared to identify matching hash values that would indicate that quoted text may be in the received email message or thread.

In one embodiment, the boundaries of the quoted text are identified by using the quoted text blocks that have been associated with the matching hash values. In one embodiment, a character-by-character comparison is done on text surrounding these quoted text blocks. This comparison may identify errors in the email, such as mistranslations and incorrectly encoded characters, which may have caused a boundary on a quoted text block to have been prematurely set or misidentified. As a result, quoted text blocks may be expanded to incorporate additional text that was quoted from a previously viewed email but misidentified by the previous text comparison. Additionally, multiple text blocks may be merged to create a larger quoted text block if that block has been erroneously divided by a character error or insert.

In one embodiment, an email header, associated with the quoted text block, may also be identified and the quoted text block expanded to include this header. In one embodiment, text preceding a quoted text block is scanned for quote attribution strings typically found in email headers. For example, attribution strings such as "To:" and "From:" may be indicative of the presence of an email header.

In one embodiment, quoted text within an email may be elided or highlighted so that a recipient can quickly identify the text block as having previously been read. In one embodiment, the quoted text block may be elided from the email thread. In another embodiment, the quoted text block may be highlighted in a different color from other text within an email message or email thread. In yet another embodiment, the quoted text block may be indented or have identifiers positioned around the quoted text block for easy identification by the individual.

In one embodiment, quoted text within an HTML-based email may be identified and elided from an email thread or highlighted in the thread, for example, to help avoid losing certain text characteristics, such as those found in HTML markups, during the identification, highlighting or eliding of quoted text blocks.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

An apparatus and method for detecting quoted text within a document, such as an email thread, is described. In one embodiment, a text comparator residing on a network server detects quoted text in an email thread that has been previously viewed by the email recipient. This quoted text may be elided or highlighted on a computer screen so that the recipient can quickly identify text that has not been previously viewed. In another embodiment, the detection of quoted text, and its elision or highlight, is caused to occur on a local client computer.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, some which are described below, may be incorporated in a number of different networking devices as software, hardware or firmware. Accordingly, structures and devices shown below in block diagram are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. System Overview

Figure 3:
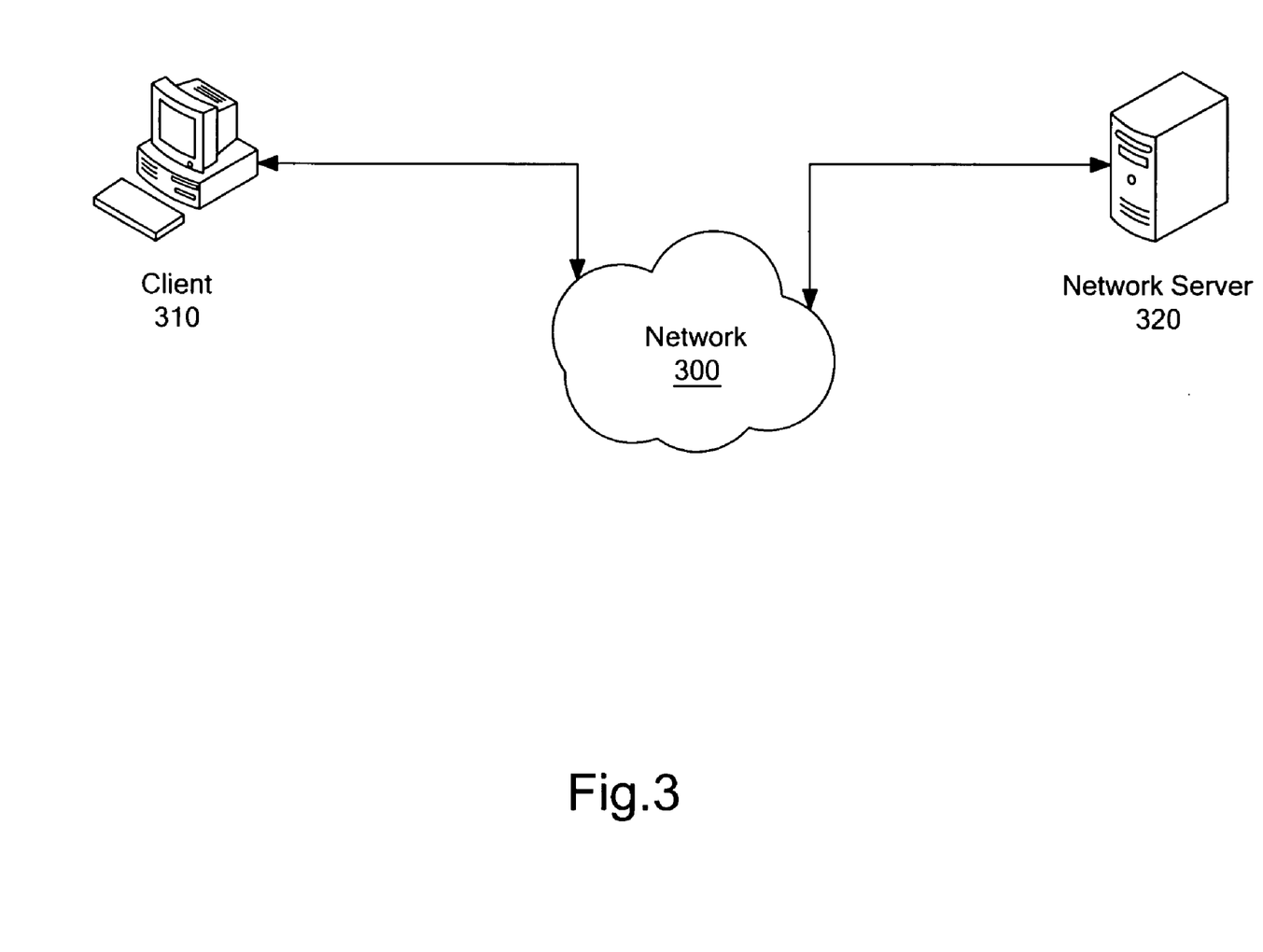
FIG. 3 is an exemplary illustration of a web-based email environment according to one embodiment of the present invention.

FIG. 3 illustrates an environment on which an embodiment of the invention may operate. As shown a computer client 310 and a network server 320 are coupled to a network 300. This network may be a private network or a public network, such as the Internet, or a combination thereof. The computer client 310 and network server 320 communicate across the network 300.

According to this embodiment, the computer client 310 has an email application that displays and retrieves email intended for a particular recipient. The application retrieves email from the network server 320 via the network 300. This retrieval may be automated or may be initiated by the recipient on the computer client 310. Once email is retrieved from the network server 320, the email is organized and displayed by the email application on the computer client 310 display. An organized display of email, in particular with long email threads, is important so that a recipient can efficiently review the email. It will become apparent to those skilled in the art that the present invention may operate on numerous types of networked devices including both the computer client 310 and the network server 320.

Figure 4:
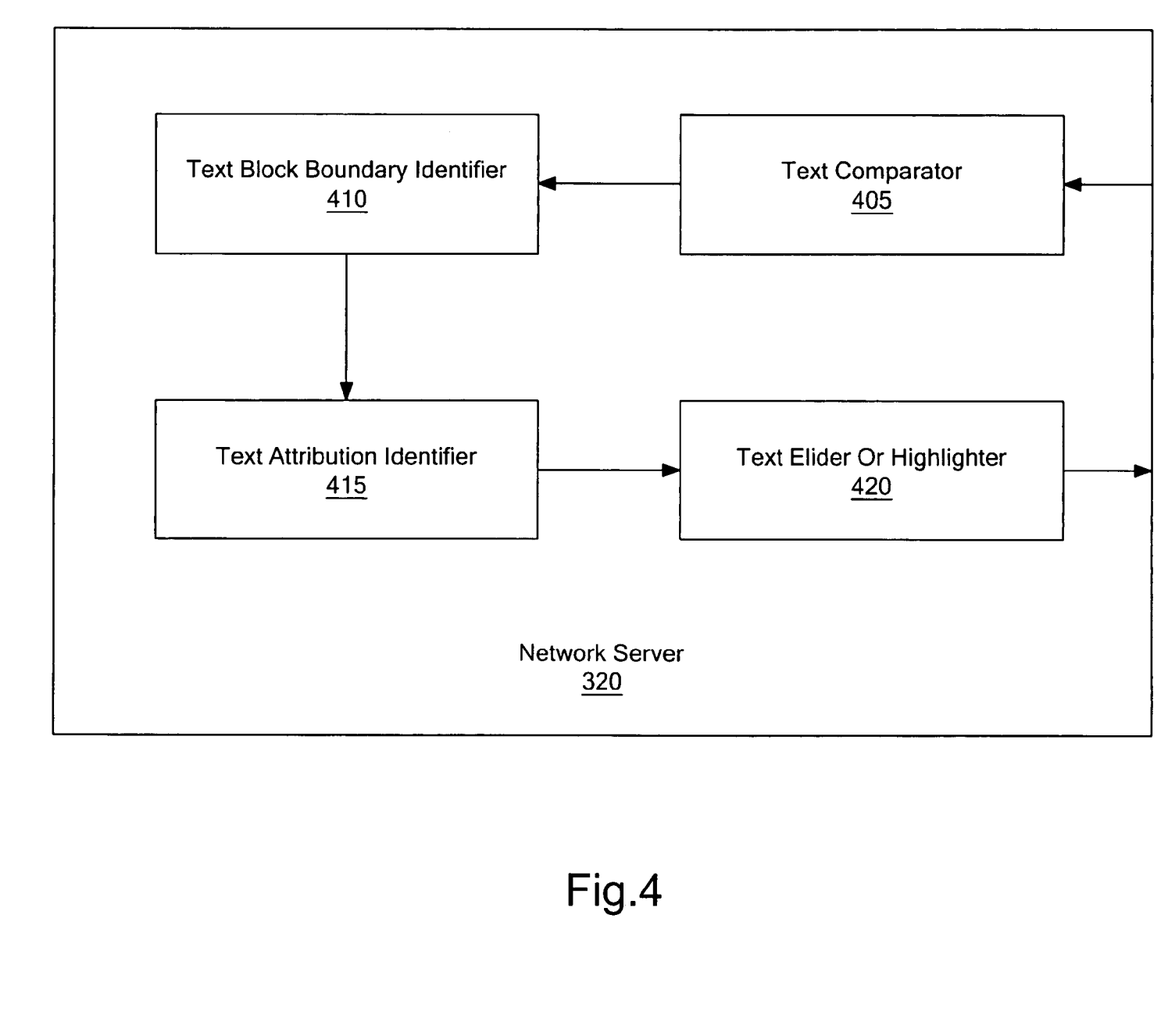
FIG. 4 is a block diagram of a network server according to one embodiment of the present invention.

FIG. 4 illustrates an embodiment of the present invention that detects and elides or highlights previously quoted text within an email thread. In this particular embodiment, the network server 320 has a text comparator 405, a text block boundary identifier 410, a text attribution identifier 415, and a text elider or highlighter 420. In another embodiment (not shown), the text comparator 405, the text block identifier 410, the text attribution identifier 415, and the text elider 420 are located on the computer client 310.

In one embodiment, the text comparator 405 compares text within an email thread to text that had been previously viewed by the email recipient. One skilled in the art will recognize from this detailed description that text comparison may be performed in many different ways. According to one embodiment, text may be compared on a word-by-word basis to identify quoted text within the email thread. According to another embodiment, a hashing function may be used to calculate a hash value for a particular sequence of words within the email thread. This hash value may be compared to other hash values, generated from previously viewed messages within the email thread by the email recipient, to identify quoted blocks of text within the email thread. Various embodiments of the comparator, described in more detail below, allow comparison of text in order to reduce delay experienced by the recipient on the client computer 310 when the email thread is retrieved.

In one embodiment, the text block boundary identifier 410 receives information about the quoted text block and further identifies an appropriate starting and ending character position of the quoted text block. This identification of a start and end character position may be accomplished by performing a character-to-character comparison of characters extending from the identified quoted text block. According to this embodiment, the text around an identified quoted text block is compared to the text around a previously viewed text block that matches the identified quoted text block. If character matches are found, then the quoted text block is expanded accordingly to include the matched characters.

In another embodiment, the text block boundary identifier 410 may merge or stitch multiple quoted text blocks, identified by the text comparator 405, to form a single quoted text block in an email thread. This type of functionality may help compensate for a mistranslated or improperly encoded character within the email thread by recognizing this error and merging the quoted text blocks around the erroneous text into a single text block. This functionality also may help compensate for text wrapping within an email which may cause only a portion of a quoted text block to be identified. A character-to-character comparison may be performed to determine if there are erroneous characters or text wrapping within the email thread. An erroneous character may be analyzed to determine if an error occurred, such as a character encoding error, or the erroneous character may be simply included within a merged block of quoted text.

In another embodiment, the text block boundary identifier 410 may align a quoted text block to a particular boundary, for example, requiring the text block to be a complete sentence or a well formed HTML block of text. Alignment of quoted text block may help prevent phrases from being mistakenly identified as quoted text because the same phrase is used in a previous email message in a thread. In one embodiment, this alignment creates a requirement for a quoted text block. If this requirement is not met, then the text block is not identified as quoted.

In yet another embodiment, the quote attribution identifier 415 may extend a quoted text block to include an email header. Email headers are typically inserted by email applications to delineate quoted text and identify certain attributes of a particular email, such as the name of the individual who sent the email, the name of the individual receiving the email, and a subject line. The quote attribution identifier 415 may scan preceding text from quoted text blocks identified by the text comparator 405 and the text boundary identifier 410 in order to identify a particular header associated with a quoted text block. One method that may be employed by the quote attribution identifier 415 is scanning text that precedes quoted text and checking for common quote attribution strings. For example, text such as "To:", "From:", and "Subject:" may be identified and attributed to an email header. Thereafter, the quoted text block may be expanded to include this email header. One skilled in the art will recognize from this description that this identification of email headers may be accomplished in numerous other ways.

In one embodiment, once text within an email thread has been identified as quoted text from a previously viewed message, and a block of this quoted text is defined, the text elider or highlighter 420 may elide or highlight the quoted text for the recipient viewing the email thread. As apparent from the above-description, this quoted text may include a quoted text block, a text block merged from multiple quoted text blocks and an email header associated with the quoted text block. For example, the text elider or highlighter 420 may elide the quoted text, in part or total, or highlight the quoted text by displaying the quoted text block in a particular font or color, indenting the quoted text block, placing identifiers around the text block (such as a "< >" or "{ }") or in various other ways to facilitate identifying the quoted text block to the recipient viewing the email thread.

B. Text Comparator

Figure 5:
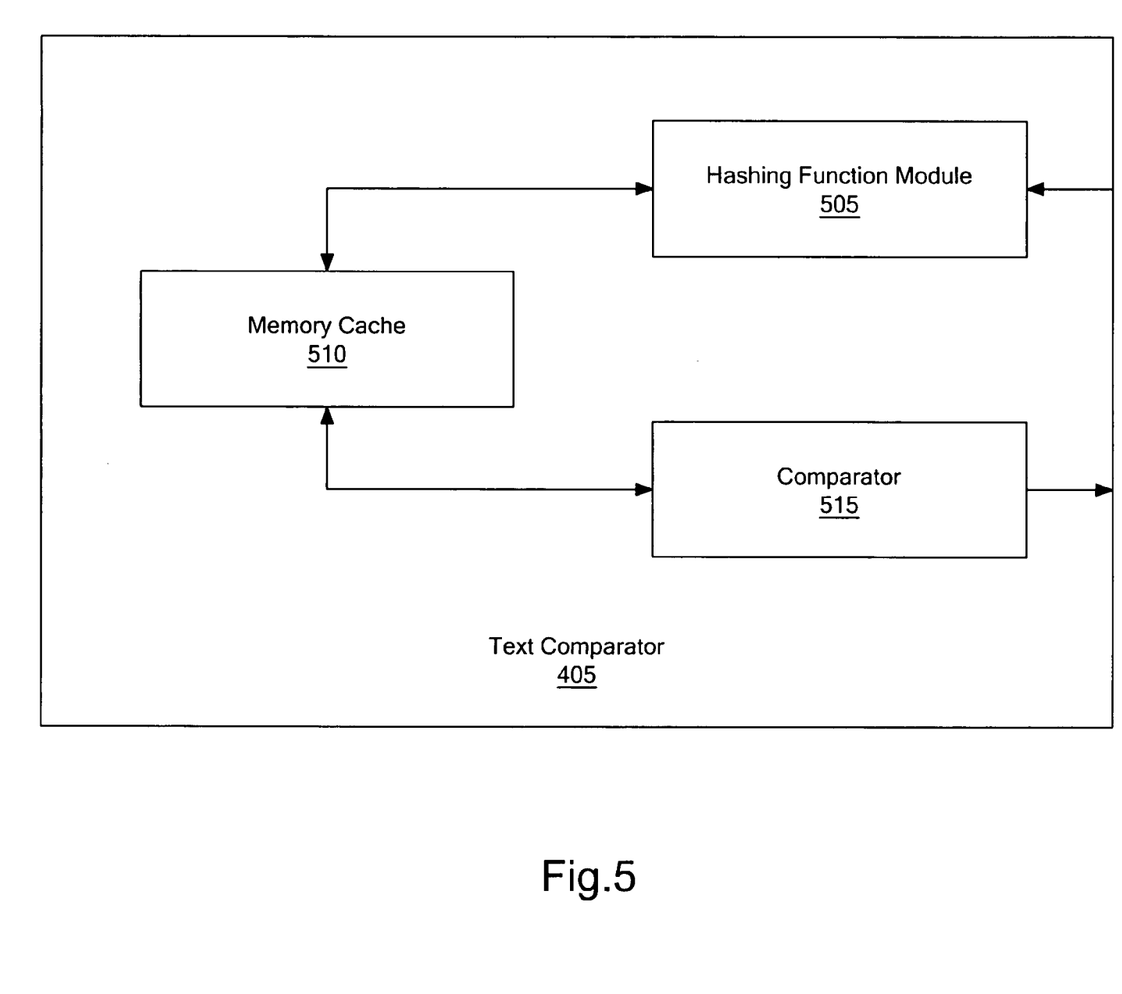
FIG. 5 is a block diagram of a word comparator according to one embodiment of the present invention.
Figure 6:
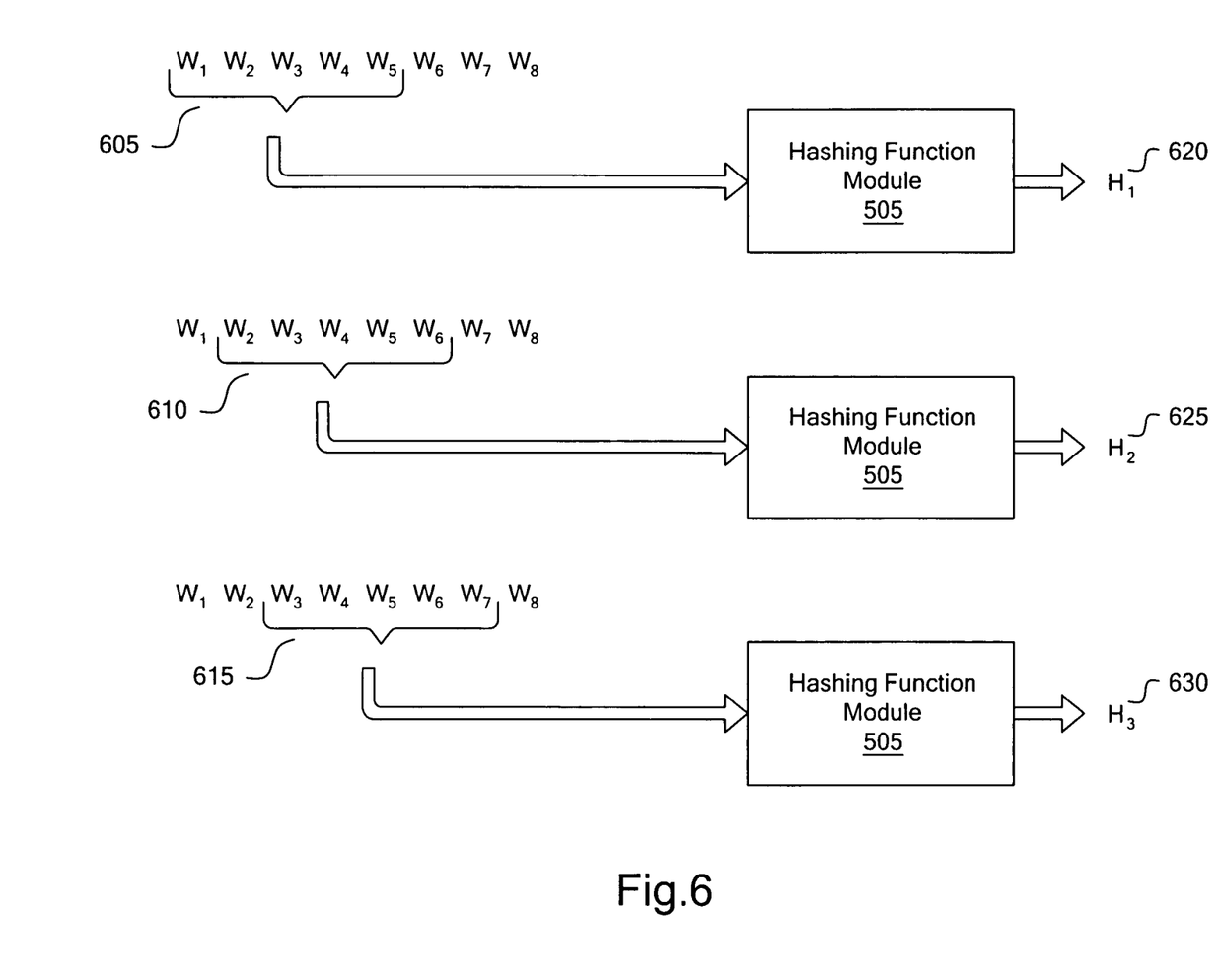
FIG. 6 is a diagram illustrating a hashing function according to one embodiment of the present invention.

FIGS. 5 and 6 illustrate more detailed embodiments of the text comparator 405 that may be used to identify quoted text according to exemplary embodiments of the present invention. As shown in FIG. 5, the text comparator 405 contains a hashing function module 505, a memory cache 510, and a comparator 515. The hashing function module 505 receives text from an email thread or other document, and creates hash values relating to the text within the email thread. These hash values may then be stored within a memory cache 510 so that a comparator 515 may compare these hash values to other hash values generated from messages within the same email thread that were previously viewed the email recipient. Various hashing functions, such as a rolling checksum, may be used to generate these hash values.

FIG. 6 illustrates a hashing function that may be used to hash text within the email thread, according to one embodiment of the invention. According to this embodiment, a string of N words found within the email thread is selected. In this particular example, five words are selected and a hash is created from these five words. $W_1$ through $W_5$ 605 are parsed from the email thread and input into the hashing function module 505, which produces a hashing value, $H_1$. A next set of words, $W_2$ though $W_6$ 610 are parsed from the email thread and input into the hashing function module 505, which produces another hashing value, $H_2$ 625. Another set of words, $W_3$ though $W_7$ 615 are parsed from the email thread and input into the hashing function module 505, which produces a third hashing value, $H_3$ 630. Thus, sequential combinations of words from a text block in the email thread are parsed and hashed for later use to identify if the text block has been previously viewed.

Referring to FIG. 5, the hashed values, $H_1$, $H_2$, and $H_3$, (620, 625, 630) are stored in the memory cache 510. The comparator 515 compares each hashed value to a second set of hashed values representative of previously viewed text, such as emails that have been previously viewed by the recipient of the email thread. This second set of hashed values relating to previously viewed text may be stored in memory or generated each time a comparison is done. During the comparison, the comparator 515 attempts to find identical hash values between the sets of hash values. If identical hash values are found, then the text block is identified as a previously viewed quoted text block. If there is no match, then the text block is not identified as a previously viewed quoted text block and presumed to contain text that has not been previously viewed. This described embodiment of the comparator 515 provides an efficient method for identifying quoted text blocks and minimizes any delay when email is being viewed by its recipient.

In some situations, certain pieces of quoted text may be misidentified or quoted text may be separated into multiple blocks, for example, due to modifications to quoted text caused by various software applications. For example, there may exist mistranslations, encoding errors or other events that may cause a hash value mismatch and cause previously viewed text to be misidentified. As previously described, these misidentified quoted text blocks may be corrected by the text block boundary identifier 410 or the text attribution identifier 415.

C. Methods of Detecting Quoted Text in an Email or Other Document

Figure 7:
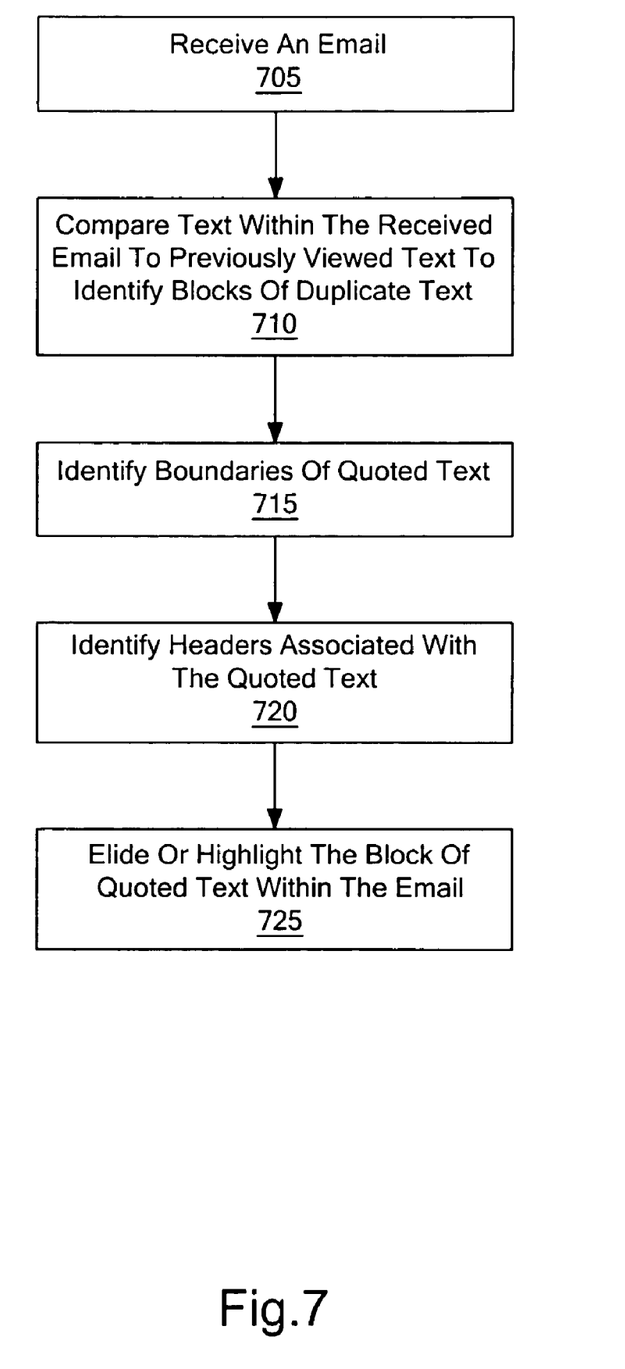
FIG. 7 is a flowchart for detecting quoted text in an email according to one embodiment of the present invention.

FIG. 7 is a flowchart illustrating an embodiment for detecting quoted text within an email thread or other document, and eliding or highlighting the quoted text during display of the email thread. As shown in this Figure, an email, including an email thread, is received 705 by a computer client or network server. In one embodiment, the text within the received email is compared 710 to text that has been previously viewed by the email recipient. This comparison may be performed using different methods including a character-to-character comparison, a word-to-word comparison, hash value comparison, or other method that compares the received text in an email to text previously viewed by an email recipient, such as text previously sent or reviewed by the email recipient.

According to an embodiment of the invention, the comparison may be performed in particular sequences relative to the email messages within a thread. For example, message headers within an email message may be analyzed to identify which other messages within a thread a referenced. Thus, if an email message is a reply to a previous message in the thread, this previous message may be referenced within the header by a message identifier. Accordingly, a comparison will first be done with email messages that are referenced within the header. However, one skilled in the art will recognize that this comparison may be performed using a number of different methods.

Once quoted text blocks are identified, boundaries of the quoted text block within the email thread are identified 715 to accurately capture quoted text. As discussed previously, one or more factors such as character encoding errors, character mistranslations, character inserts, text wrapping and/or other events may cause quoted text to be misidentified during the text comparison 710. In one embodiment, the start and end positions of the identified quoted text blocks may be extended by doing a character-by-character comparison on the characters near the start of the quoted text block and near the end of the quoted text block. This comparison may look for particular symbols, such as ">" that are inserted by other email applications. The character comparison may also look for encoding errors or text wrapping that may falsely indicate the end of quoted text block. The character comparison may also directly compare the characters around the quoted text block in an email to the text, corresponding to the quoted text block, which had been previously viewed by the email recipient. After this character comparison, text blocks may be extended to include certain characters or symbols identified by the character comparison. Text blocks may also be merged to compensate for encoding errors or other events that may have erroneously caused a quoted text block to be separated into multiple blocks.

In one embodiment, a header associated with a quoted text block also may be identified 720 to further expand the block of quoted text. In one embodiment, text preceding each quoted text block is scanned for quote attribution strings that are typically found in email headers. As previously described, these quote attribution strings may include "To:", "From:", and other strings associated with email headers. If these strings are identified by this scan, the associated quoted text block is extended to include the identified header.

In one embodiment, the quoted text block is distinguished within the email thread, such as being elided 725 or caused to be highlighted, so that an individual will recognize that the text block has been previously viewed. The highlighting of the quoted text block may include causing the characters within the text block to be displayed in a particular font or color, indenting the text block, placing identifiers around the text block or in other ways to help identify the quoted text block as being previously viewed. Additionally, various rules may be applied to elide the quoted text block such as eliding an entire block of quoted text within an email thread, eliding an entire email message containing a quoted text block, or eliding a portion of an email message containing a quoted text block and/or others.

Figure 8:
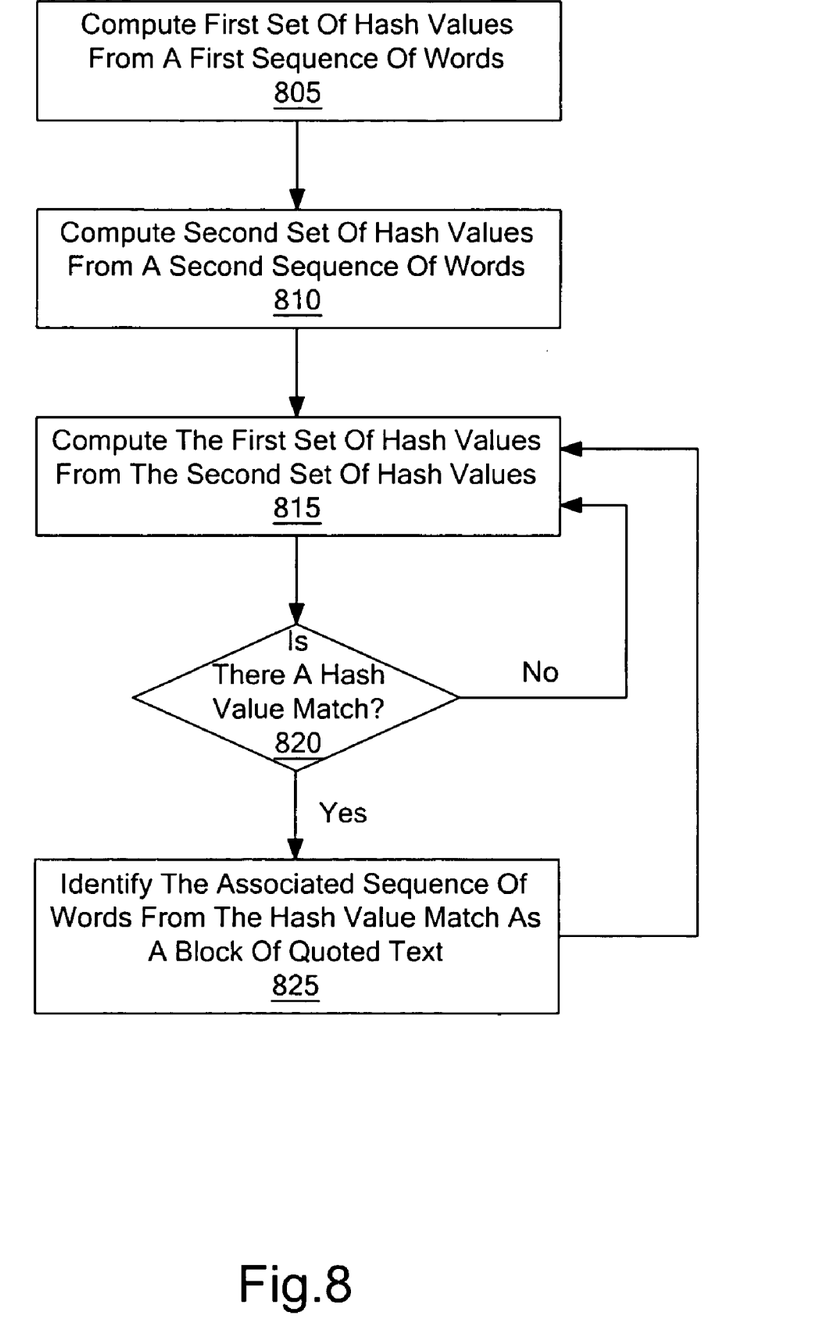
FIG. 8 is a flowchart for identifying a quoted phrase within an email according to one embodiment of the present invention.

FIG. 8 is a flowchart illustrating a method for text comparison that may be used to identify quoted text within an email or other document according to one embodiment of the present invention. A first set of hash values is computed 805 using text within a received email. This first set of hash values is stored in a first hash table within a memory cache. Other attributes (such as the text location, font, color, etc.) about the text may be stored in the first hash table as well in order to facilitate an appropriate mapping of the text back into the email or other document. A second set of hash values is computed 810 using text of messages within the email thread that the recipient has previously viewed. This second set of hash values is stored in a second hash table. This second hash table may be stored in the same memory cache as the first hash table or may be stored is a separate memory cache.

A rolling checksum may be used to compute hash values according to one embodiment. In this embodiment, only letters (English and non-English) or digits within the received email or previously viewed text are used to compute hash values. This may help reduce the effect of inserted (non-letter/digit) symbols, which would be ignored by the hashing mechanism. In one embodiment, the rolling checksum generates an array of hash values corresponding to a block of text or sequence of words. One skilled in the art will recognize that there are numerous methods that may be used to compute hash values.

Hash values from the first set are compared 815 to hash values from the second set to identify matching 820 hash values and relating quoted text blocks. In one embodiment, if a hash value from the first set matches a hash value from the second set, then contiguous values from each set are compared to determine the length of the quoted text. If the number of matching contiguous hash values is above a threshold, then a block of text is identified 825 as quoted text. This embodiment provides an efficient comparison method that does not cause large delays on the computer client or network server when the comparison is being performed.

Figure 9:
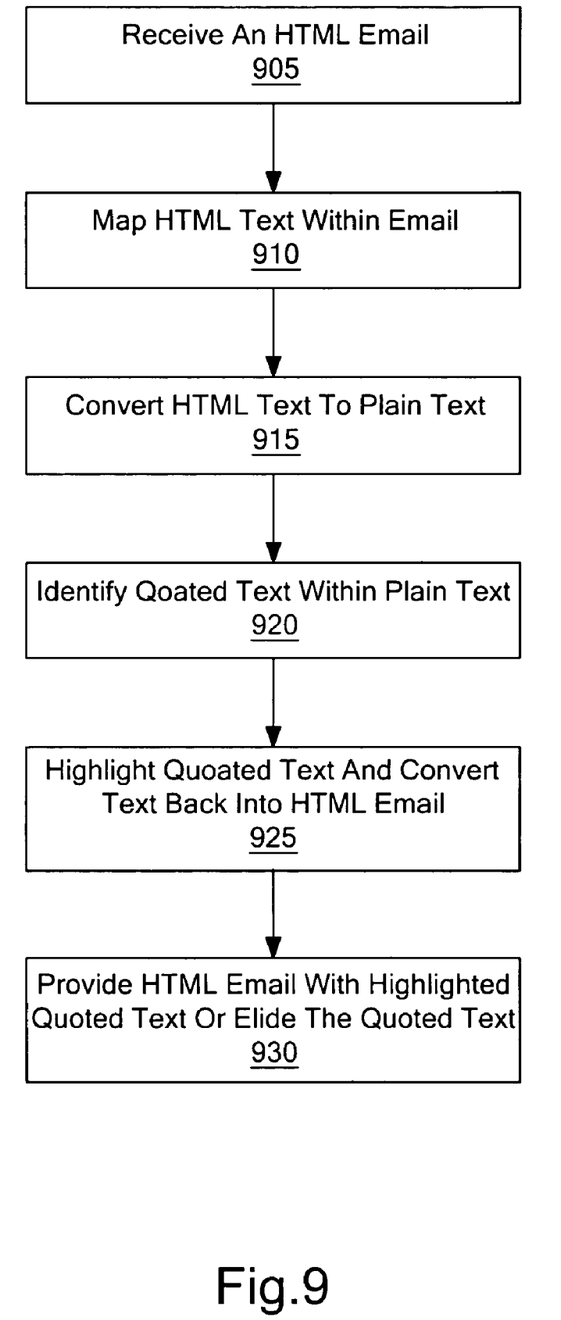
FIG. 9 is a flowchart for detecting quoted text in an HTML-based email according to one embodiment of the present invention.

FIG. 9 is a flowchart illustrating an embodiment of a method for detecting quoted text within a hypertext markup language ("HTML") email. In one embodiment, an HTML-based email message or email thread is received 905. Text within the HTML email is mapped 910 to identify HTML markups associated with each piece of text. These markups may identify a location of the text within the HTML frame, font or color characteristics of the text, or other text characteristics that may be provided in HTML markups. In one embodiment, HTML markups are stored within a cache and an identifier is also stored that associates the stored markups with a particular piece of text. One skilled in the art will recognize that this mapping may be performed using numerous methods.

Text within the HTML email is converted 915 to plain text so that a quoted text block(s) may be more easily identified. As previously described, quoted text blocks are identified 920 by comparing text within a received email to text within previously viewed emails. Converting the HTML text to plain text may help facilitate comparison of the text blocks. In one embodiment, the comparison is performed using the previously described hashing and hash value comparison method.

Text that is quoted from previously seen emails is identified, and elided or caused to be highlighted 925 so that the recipient may more easily recognize the quoted text. This text is then converted back into an HTML format using the previously generated HTML text mapping. This conversion may help quoted text block to be appropriately displayed within an HTML frame and still be appropriately elided or highlighted or otherwise identified so that it is recognized as quoted text.

The email or email chain is provided 930 to the recipient with the quoted text elided or highlighted for easier recognition. This quoted text may be highlighted by the color or font of the text, or providing some identifier so that an individual can recognize the text block as being previously viewed.

While the present invention has been described with reference to certain embodiments, those skilled in the art will recognize that various modifications may be provided. For example, numerous types of analyses and steps may be performed in order to compare pieces of text and to identify matches between these pieces of text. Furthermore, though the invention has been primarily explained with reference to specific, exemplary embodiments using email, it should be appreciated that the invention is not limited to such, and in fact, may be used within different types of message documents, such as instant messaging messages, Usenet postings, message boards, etc. Variations upon and modifications to the exemplary embodiments will become apparent to those skilled in the art having read the above disclosure. Accordingly, it is intended that the appended claims (which may be amended from time to time), each of which represents and is hereby incorporated in this description as a separate embodiment of the invention, be interpreted as covering alternations and modifications as fall within the spirit and scope of the invention.

We claim:

1. A method for detecting quoted text within a document, the method comprising:
    generating a first set of hash values for a first sequence of words within a first document;
    generating a second set of hash values for a second sequence of words within a second document;
    comparing the first set of hash values to the second set of hash values to identify matching hash values corresponding to at least a portion of a block of quoted text within the first document; and
    identifying additional portions, on a character-by-character basis, of the block of quoted text by comparing additional text contiguous to the first sequence of words to additional text contiguous to the second sequence of words;
    wherein comparing the first set of hash values to the second set of hash values to identify matching hash values corresponding to at least a portion of a block of quoted text within the first document comprises:
    identifying a first sequence of hash values of the first set of hash values that match a second sequence of hash values of the second set of hash values, wherein a length of the first sequence is above a predefined threshold; and
    identifying text within the first document corresponding to the first sequence of hash values as a first portion of the block of quoted text.

2. The method of claim 1 further comprising eliding the block of quoted text from the first document.

3. The method of claim 1 further comprising highlighting the block of quoted text within the first document.

4. The method of claim 3 wherein the block of quoted text is highlighted by causing the block of quoted text to be displayed in a color different from other text within the first document.

5. The method of claim 3 wherein the block of quoted text is highlighted by causing the block of quoted text to be indented within the first document.

6. The method of claim 1 wherein the first document includes an email thread.

7. The method of claim 6 further comprising identifying an email header associated with block of quoted text.

8. The method of claim 7 wherein the email header is identified by scanning text preceding the block of quoted text for particular attribution strings.

9. The method of claim 1 wherein the first set of hash values is generated using a rolling checksum function.

10. The method of claim 1 wherein the first set of hash values is generated only from letters or digits found within the first document.

11. The method of claim 1 wherein the first set of hash values is generated using N sequential words within the first document.

12. The method of claim 1 wherein at least a portion of the block of quoted text is identified by merging two previously identified blocks of quoted text into a single block of quoted text.

13. A method for detecting quoted text within a document, the method comprising:
   generating a first set of hash values for a first sequence of words within a first document;
   generating a second set of hash values for a second sequence of words within a second document;
   comparing the first set of hash values to the second set of hash values to identify matching hash values corresponding to at least a portion of a block of quoted text within the first document; and
   identifying additional portions, on a character-by-character basis, of the block of quoted text by comparing additional text contiguous to the first sequence of words to additional text contiguous to the second sequence of words;
   wherein generating the first set of hash values comprises generating a first plurality of hash values for a plurality of overlapping subsequences of the first sequence of words;
   wherein generating the second set of hash values comprises generating a second plurality of hash values for a plurality of overlapping subsequences of the second sequence of words; and
   wherein comparing the first set of hash values to the second set of hash values to identify matching hash values corresponding to at least a portion of a block of quoted text within the first document comprises:
   identifying a first sequence of hash values of the first set of hash values that match a second sequence of hash values of the second set of hash values, wherein a length of the first sequence is above a predefined threshold; and
   identifying text within the first document corresponding to the first sequence of hash values as a first portion of the block of quoted text.

14. A system for detecting quoted text, comprising:
   a hashing module to generate a first set of hash values for a first sequence of words within a first document and to generate a second set of hash values for a second sequence of words within a second document; and
   a comparator module to compare the first set of hash values to the second set of hash values to identify matching hash values, which correspond to at least a portion of a block of quoted text within the first document, and to identify additional portions, on a character-by-character basis, of the block of quoted text by comparing additional text contiguous to the first sequence of words to additional text contiguous to the second sequence of words;
   wherein the comparison module is configured to identify a first sequence of hash values of the first set of hash values that match a second sequence of hash values of the second set of hash values, wherein a length of the first sequence is above a predefined threshold, and to identify text within the first document corresponding to the first sequence of hash values as a first portion of the block of quoted text.

15. The system of claim 14, further comprising a text elider module to elide the block of quoted text from the first document.

16. The system of claim 14, further comprising a text highlighter to highlight the block of quoted text within the first document.

17. The system of claim 16, wherein the block of quoted text is highlighted by causing the block of quoted text to be displayed in a color different from other text within the first document.

18. The system of claim 16, wherein the block of quoted text is highlighted by causing the block of quoted text to be indented within the first document.

19. The system of claim 14, wherein the first document includes an email thread.

20. The system of claim 19, wherein the comparator module is configured to identify an email header associated with block of quoted text.

21. The system of claim 20, wherein the comparator module is configured to identify the email header by scanning text preceding the block of quoted text for particular attribution strings.

22. The system of claim 14, wherein the hash module is configured to generate the first set of hash values using a rolling checksum function.

23. The system of claim 14, wherein the hash module is configured to generate the first set of hash values only from letters or digits found within the first document.

24. The system of claim 14, wherein the hash module is configured to generate the first set of hash values using N sequential words within the document.

25. The system of claim 14, wherein the comparison module is configured to identify at least a portion of the block of quoted text by merging two previously identified blocks of quoted text into a single block of quoted text.

26. A system for detecting quoted text, comprising:
   a hashing module to generate a first set of hash values for a first sequence of words within a first document and to generate a second set of hash values for a second sequence of words within a second document; and
   a comparator module to compare the first set of hash values to the second set of hash values to identify matching hash values, which correspond to at least a portion of a block of quoted text within the first document, and to identify additional portions, on a character-by-character basis, of the block of quoted text by comparing additional text contiguous to the first sequence of words to additional text contiguous to the second sequence of words;
   a hashing module to generate a first set of hash values for a first sequence of words within a first document and to generate a second set of hash values for a second sequence of words within a second document; and
   a comparator module to compare the first set of hash values to the second set of hash values to identify matching hash values, which correspond to at least a portion of a block of quoted text within the first document, and to identify additional portions, on a character-by-character basis, of the block of quoted text by comparing additional text contiguous to the first sequence of words to additional text contiguous to the second sequence of words;
   wherein the hash module is configured to generate the first set of hash values by generating a first plurality of hash values for a plurality of overlapping subsequences of the first sequence of words, and to generate the second set of hash values by generating a second plurality of hash values for a plurality of overlapping subsequences of the second sequence of words; and wherein the comparison module is configured to identify a first sequence of hash values of the first set of hash values that match a second sequence of hash values of the second set of hash values, wherein a length of the first sequence is above a predefined threshold, and to identify text within the first document corresponding to the first sequence of hash values as a first portion of the block of quoted text.

27. A computer program product embodied on a computer readable medium for enabling a detection of quoted text within a first message, the computer program product comprising computer instructions for:

generating a first set of hash values for a first sequence of words within a first document;

generating a second set of hash values for a second sequence of words within a second document;

comparing the first set of hash values to the second set of hash values to identify matching hash values corresponding to at least a portion of a block of quoted text within the first document; and identifying additional portions, on a character-by-character basis, of the block of quoted text by comparing additional text contiguous to the first sequence of words to additional text contiguous to the second sequence of words;

wherein the instructions for comparing include instructions for:

identifying a first sequence of hash values of the first set of hash values that match a second sequence of hash values of the second set of hash values, wherein a length of the first sequence is above a predefined threshold; and identifying text within the first document corresponding to the first sequence of hash values as a first portion of the block of quoted text.

28. The computer program product of claim 27, further comprising computer instructions for eliding the block of quoted text from the first document.

29. The computer program product of claim 27, further comprising computer instructions for highlighting the block of quoted text within the first document.

30. The computer program product of claim 29, including computer instructions for highlighting the block of quoted text by causing the block of quoted text to be displayed in a color different from other text within the first document.

31. The computer program product of claim 29, including computer instructions for highlighting the block of quoted text by causing the block of quoted text to be indented within the first document.

32. The computer program product of claim 27, wherein the first document includes an email thread.

33. The computer program product of claim 32, further comprising identifying an email header associated with block of quoted text.

34. The computer program product of claim 33, including computer instructions for identifying the email header by scanning text preceding the block of quoted text for particular attribution strings.

35. The computer program product of claim 27, including computer instructions for generating the first set of hash values using a rolling checksum function.

36. The computer program product of claim 27, including computer instructions for generating the first set of hash values only from letters or digits found within the first document.

37. The computer program product of claim 27, including computer instructions for generating the first set of hash values using N sequential words within the first document.

38. The computer program product of claim 27, including computer instructions for identifying at least a portion of the block of quoted text by merging two previously identified blocks of quoted text into a single block of quoted text.

39. A computer program product embodied on a computer readable medium for enabling a detection of quoted text within a first message, the computer program product comprising computer instructions for:

generating a first set of hash values for a first sequence of words within a first document;

generating a second set of hash values for a second sequence of words within a second document;

comparing the first set of hash values to the second set of hash values to identify matching hash values corresponding to at least a portion of a block of quoted text within the first document; and identifying additional portions, on a character-by-character basis, of the block of quoted text by comparing additional text contiguous to the first sequence of words to additional text contiguous to the second sequence of words;

wherein the instructions for the generating the first and second sets of hash values include instructions for generating the first set of hash values by generating a first plurality of hash values for a plurality of overlapping subsequences of the first sequence of words, and generating the second set of hash values by generating a second plurality of hash values for a plurality of overlapping subsequences of the second sequence of words; and wherein the instructions for comparing include instructions for:

identifying a first sequence of hash values of the first set of hash values that match a second sequence of hash values of the second set of hash values, wherein a length of the first sequence is above a predefined threshold; and identifying text within the first document corresponding to the first sequence of hash values as a first portion of the block of quoted text.

* * * * *